(12) United States Patent
Hutchings

(10) Patent No.: US 9,019,371 B2
(45) Date of Patent: Apr. 28, 2015

(54) METHOD AND DEVICE FOR TELE-VIEWING

(75) Inventor: Cédric Hutchings, Issy les Moulineaux (FR)

(73) Assignee: Withings, Issy les Moulineaux (FR)

( * ) Notice: Subject to any disclaimer, the term of this patent is extended or adjusted under 35 U.S.C. 154(b) by 399 days.

(21) Appl. No.: 13/122,936

(22) PCT Filed: Oct. 12, 2009

(86) PCT No.: PCT/FR2009/051936
§ 371 (c)(1),
(2), (4) Date: Apr. 21, 2011

(87) PCT Pub. No.: WO2010/043805
PCT Pub. Date: Apr. 22, 2010

(65) Prior Publication Data
US 2012/0105631 A1    May 3, 2012

(30) Foreign Application Priority Data
Oct. 13, 2008  (FR) ..................................... 08 56932

(51) Int. Cl.
| | |
|---|---|
| *H04N 9/47* | (2006.01) |
| *H04N 7/18* | (2006.01) |
| *G08B 13/196* | (2006.01) |
| *H04N 5/232* | (2006.01) |

(52) U.S. Cl.
CPC .......... *H04N 7/185* (2013.01); *G08B 13/19682* (2013.01); *G08B 13/19684* (2013.01); *G08B 13/19689* (2013.01); *H04N 5/23203* (2013.01); *H04N 5/23206* (2013.01); *H04N 5/23216* (2013.01)

(58) Field of Classification Search
CPC ......... H04N 7/181; H04N 7/183; H04N 7/18; H04N 7/188; G08B 13/19656
USPC .................................. 348/36–39, 42–60, 143
See application file for complete search history.

(56) References Cited

U.S. PATENT DOCUMENTS 6,141,034 A * 10/2000 McCutchen ..................... 348/36
6,597,393 B2 * 7/2003 Kato et al. ............... 348/211.99
(Continued)

FOREIGN PATENT DOCUMENTS

| EP | 1 515 546 A2 | 3/2005 |
|---|---|---|
| GB | 2 252 473 A | 5/1992 |

OTHER PUBLICATIONS

International Search Report for related international application No. PCT/FR2009/051936, report dated Jan. 25, 2010.
(Continued)

*Primary Examiner* — Andy Rao
*Assistant Examiner* — Jared Walker
(74) *Attorney, Agent, or Firm* — Miller, Matthias & Hull LLP

(57) ABSTRACT

A method of tele-viewing in which a virtual image of a place to be viewed, obtained on the basis of old images of this place, is presented on the screen (9a) of a control device, the desired viewpoint is obtained by navigating around this virtual image, the desired viewpoint is confirmed, the field of vision of a picture-taking device is moved so that it is located according to the desired viewpoint and it is made to take at least one current image of the place to be viewed, and then this current image is transmitted to the control device and is displayed on its screen.

9 Claims, 4 Drawing Sheets

(56) References Cited

U.S. PATENT DOCUMENTS

2003/0165192 A1* 9/2003 Kitta ..................... 375/240.01
2006/0077255 A1* 4/2006 Cheng ......................... 348/143
2006/0256202 A1* 11/2006 Hohenacker ............. 348/211.99

OTHER PUBLICATIONS

French Search Report for priority application No. FR 08 56932; Report dated Jun. 3, 2009.

* cited by examiner

METHOD AND DEVICE FOR TELE-VIEWING

CROSS-REFERENCE TO RELATED APPLICATIONS

This application is a U.S. national stage filing of International Patent Application No. PCT/FR2009/051936 filed on Oct. 12, 2009, which claims priority under the Paris Convention to French Patent Application No. 08 56932, filed on Oct. 13, 2008.

FIELD OF THE DISCLOSURE

The present invention relates to tele-viewing methods and devices.

More particularly, the invention relates to a tele-viewing method comprising the following steps:
- (a) a connection step during which a control device provided with a screen is made to remotely communicate with a motor-driven camera appliance with mobile field of view arranged in a place to be viewed, said camera appliance being suitable for seeing the place to be viewed from a plurality of viewpoints,
- (b) a control step during which the field of view movements of said camera appliance are controlled to obtain a desired viewpoint over the place to be viewed out of said plurality of viewpoints,
- (c) a display step during which the place to be viewed is remotely displayed from the desired viewpoint, on the screen of the control device.

BACKGROUND OF THE DISCLOSURE

In the known methods of this type, the camera appliance permanently sends images of the place to be viewed to the control device, during the movements of the field of view of the camera appliance. The user controls these movements according to the image he sees on the screen, but these images often arrive only after a delay because of the latency time between the sending of an image by the camera device and the complete arrival of this image on the control device: this latency phenomenon makes it difficult and tedious to remotely control the movement of the field of view is problematic.

Furthermore, in these known methods, handling errors on the part of the user or the changes of viewpoint that he makes before arriving at the desired viewpoint result in as many movements of the camera appliance when the change of viewpoint is obtained by virtue of a motor drive for this camera appliance: the result of this is unnecessary wear of the mechanism that drives the camera appliance and pointless energy consumption (this latter point is especially important when the camera device operates on batteries).

An example of known method of the abovementioned type is described in the document US-A-2006/256202. In this method, a user can point to a panoramic image of a place to be monitored, of areas for which the user wants to see a sequential scrolling of the images. A camera is then pointed successively to these areas to successively present on the screen real images of these areas.

SUMMARY OF THE DISCLOSURE

The main aim of the present invention is to improve the ergonomics of a method of the abovementioned type.

To this end, according to the invention, the abovementioned control step (b) comprises the following substeps:
- (b1) a virtual image of the place to be viewed is presented on the screen of the control device (the expression "virtual image" should be understood to mean an image that does not necessarily correspond to the current image of the place to be viewed) seen from a first viewpoint (C1) out of said plurality of viewpoints, said virtual image being obtained from virtual image data previously stored in the control device on the basis of old images of said place to be viewed (the expression "old images" should be understood to mean images taken prior to said control step),
- (b2) navigation in said virtual image is obtained by modifying the viewpoint of the virtual image out of said plurality of viewpoints, until the desired viewpoint is obtained,
- (b3) the desired viewpoint is confirmed,
- (b4) the field of view of the camera device is moved so that it is placed according to the desired viewpoint and it is made to take at least one current image of the place to be viewed from said desired viewpoint,
- (b5) said current image is transmitted to the control device and it is displayed on the screen of the control device.

By virtue of these arrangements, the user can easily navigate locally in the virtual image of the place to be viewed, freed of any latency time that could be due to the transmission between the camera appliance and the control device. In this way, he can immediately appreciate the final image that will be obtained, and can therefore immediately best adjust the desired viewpoint.

Furthermore, this navigation does not cause any unnecessary movement of the field of view of the camera appliance, since this field of view is modified only when the user has confirmed the desired viewpoint on the virtual image, and therefore when he is sure of the desired viewpoint. The result of this is an energy saving on the camera appliance and less wear of this appliance.

In embodiments of the method according to the invention, it is possible, if appropriate, to also use one and/or the other of the following arrangements:
- during the substep (b4), intermediate images of the place to be viewed from intermediate viewpoints between an initial viewpoint and the desired viewpoint are stored while the field of view of the camera appliance is moved to the desired viewpoint;
- said intermediate images are used to update said virtual image data in the control device, said virtual image data being subsequently used to create locally, on the control device, a virtual image of the place to be viewed.

Moreover, the subject of the invention is also a tele-viewing device comprising:
- a motor-driven camera appliance with mobile field of view designed to be arranged in a place to be viewed, said camera appliance being suitable for seeing the place to be viewed from a plurality of viewpoints (C1, C2),
- a control device provided with a screen,
- link means suitable for having said camera appliance communicate remotely with said one control device, the control device being provided with a user interface enabling a user to control movements of the field of view of said camera appliance to obtain a desired viewpoint over the place to be viewed out of said plurality of viewpoints, and the screen of the control device being suitable for remotely displaying the place to be viewed from the desired viewpoint, the control device being designed to present on the screen a virtual image of the place to be viewed seen from a first viewpoint (C1) out of said plurality of viewpoints, said virtual image being obtained from virtual image data previously stored in the control device from old images of said place to be viewed, said user interface being designed to enable a user to navigate in said virtual image by modifying the viewpoint of the virtual image out of said plurality of viewpoints until the desired viewpoint is obtained, and to confirm the desired viewpoint, said control device being designed to transmit to the camera appliance a command to make a part (10) of the camera device (7) move to place the field of view of the camera device according to the desired viewpoint and to make it take at least one current image of the place to be viewed from said desired viewpoint, and said control device being designed to receive said current image via said link means and to display it on the screen.

In embodiments of the device according to the invention, it is also possible, if appropriate, to also use one and/or the other of the following arrangements:

the camera appliance is a motor-driven digital camera;

the camera appliance operates on a battery;

the camera appliance is designed to take intermediate images of the place to be viewed from intermediate viewpoints between an initial viewpoint and the desired viewpoint while the field of view of the camera appliance is moved to the desired viewpoint;

the camera appliance is designed to transmit said intermediate images to the control device (optionally at different times) and said control device is designed to use said intermediate images to update said virtual image data.

BRIEF DESCRIPTION OF THE DRAWINGS

Other features and advantages will become apparent from the following description of one of its embodiments, given as a nonlimiting example, in light of the appended drawings.

In the drawings.

DETAILED DESCRIPTION OF THE DISCLOSURE

In the various figures, the same references designate identical or similar elements.

Figure 1:
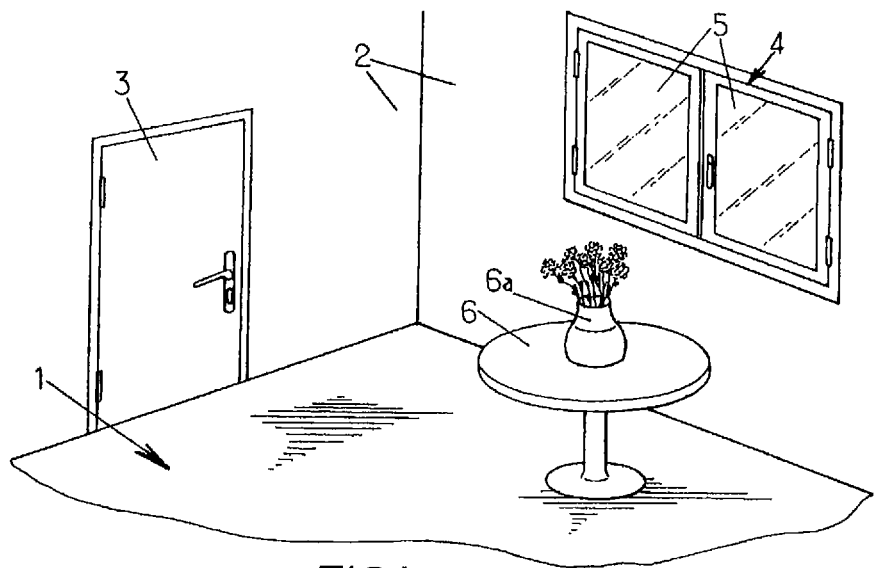
FIG. 1 is a perspective view showing an example of a place that can be viewed remotely by the method according to the invention.

FIG. 1 shows a place 1 that can be remotely monitored according to the tele-viewing method of the invention, for example for the purposes of remote monitoring. The place to be viewed 1 may comprise, for example, one or more rooms of a building and, in the example represented in FIG. 1, this room is delimited by walls 2 and has an access door 3, a window 4 provided with casements 5 and furniture 6, 6a, for example a table 6 supporting a vase 6a.

Figure 2:
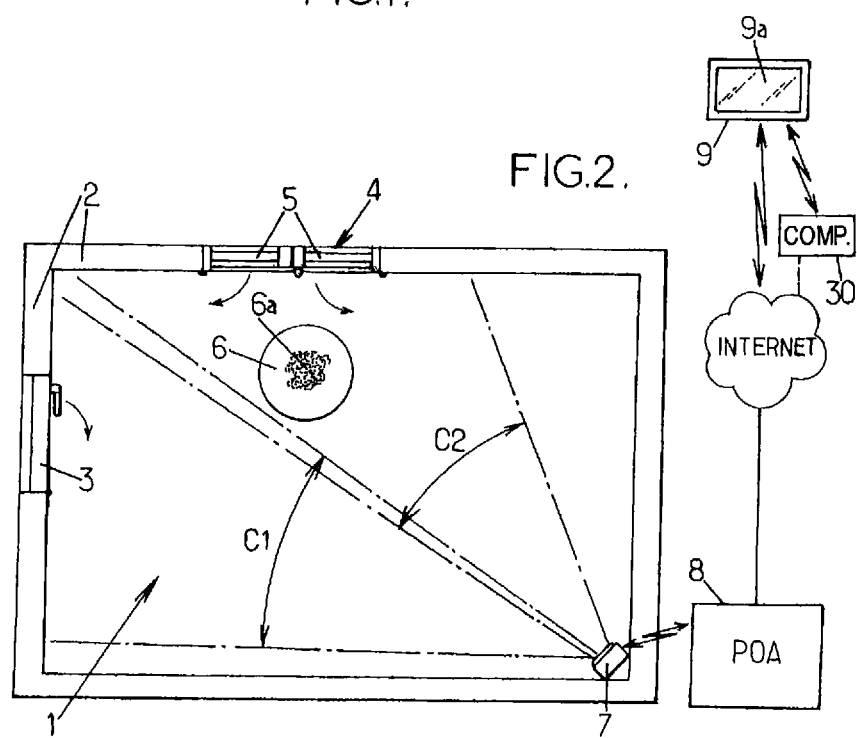
FIG. 2 is a schematic view showing the configuration of the place to be viewed and the tele-viewing device used in one embodiment of the invention.

As represented in FIG. 2, this place can be viewed remotely by means of one or more camera appliances 7 with mobile field of view, for example a motor-driven digital camera, mounted to pivot on one or two rotation axes. The field of view of the digital camera 7 can be moved substantially continuously. As an example, FIG. 2 shows the position of the field of view of the digital camera 7 from a first viewpoint C1 in which the field of view covers the door 3, and the position of view from a second viewpoint C2 in which said field of view covers the window 4.

The digital camera generally operates on a battery (disposable battery or rechargeable storage cell) but could, if appropriate, operate on the mains supply.

This digital camera 7 (or each digital camera 7 if there are several thereof) communicates, for example, by radio channel, with an Internet point of access 8, for example a WI-FI router if the radio communication between the digital camera 7 and the point of access 8 is implemented by using the WI-FI protocol. The point of access 8 may be linked, for example, to the telephone network by wired channel, so as to access the Internet and thus communicate with a control device 9 provided with a screen 9a on which a user can display images (fixed images or video sequences) taken by the digital camera 7.

The control device 9 can, for example, be a cell phone, that could, if appropriate, be a portable or non-portable microcomputer, or similar. The control device 9 is connected to the Internet network by radio channel in the present case, for example according to the GPRS or 3GPP protocol (UMTS for example). It will be noted that, according to a possible variant, the control device 9 could communicate with the point of access 8, without involving the Internet, but by using only the radio network, in GPRS or 3GPP mode (in this case, the point of access 8 would obviously have to be provided with radio communication means compatible with the protocol to be used).

If necessary, the point of access 8 may also communicate, via the Internet, with a remote computation center 30 (COMP) which may in turn communicate with the control device 9 by Internet or directly by radio channel.

Figure 3:
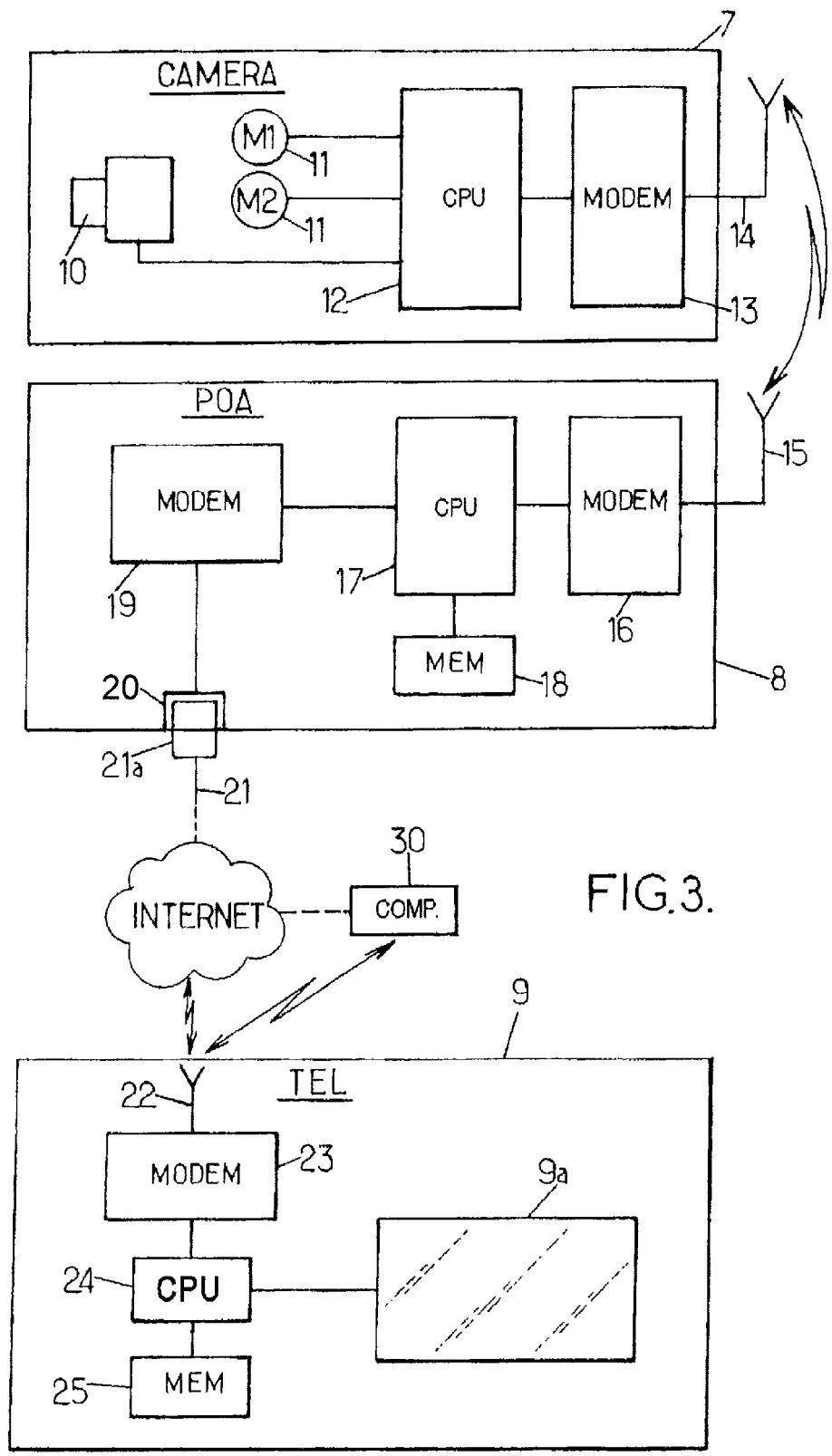
FIG. 3 is a block diagram illustrating certain components of the appliances belonging to the tele-viewing device of FIG. 2.

As represented in FIG. 3, the digital camera 7 may comprise, for example, a mobile part 10 (comprising at least the lens and a sensor, for example CCD or CMOS) mounted to pivot, for example, on two rotation axes and controlled by two stepper motors 11 (M1, M2).

The stepper motors 11 are controlled by an electronic central processing unit 12 (CPU) such as a microprocessor or microcontroller, which central processing unit also receives the images taken by the mobile part 10 and can compress them and code them according to any known format (for example, in the JPEG format in the case of fixed images or MPEG format in the case of video sequences, or other formats).

The central processing unit 12 is also linked to a modem 13, for example a WI-FI modem, provided with an antenna 14 which enables the digital camera 7 to communicate with the Internet point of access 8.

The Internet point of access 8 is itself provided with an antenna 15 linked to a WI-FI modem 16, which communicates with an electronic central processing unit 17 (CPU) such as a microprocessor or microcontroller. The central processing unit 17 may communicate with an external memory 18 (MEM) making it possible, if necessary, to store images originating from the digital camera 7 (fixed images or video sequences) and received from said digital camera 7 by radio channel. The central processing unit 17 also communicates with another modem 18, for example an ADSL modem, provided with a connection port 20 that may be linked to the connector 21a of a cable 21 linked to the telephone network to access the Internet. It will be noted that the Internet point of access 8 could, if necessary, be a more complex device comprising, for example, a microcomputer (not represented) associated with an external modem.

The control device 9 (TEL), which can notably be a cell phone as already explained hereinabove, may comprise, for example, an antenna 22 linked to a modem 23 that can communicate externally by radio channel, for example in GPRS mode or for 3GPP, this modem being linked to an electronic central processing unit 24 (CPU) such as a microprocessor or a microcontroller provided with a memory 25 (MEM) and linked to the abovementioned screen 9a which may, for example, be a touch screen in the embodiment considered here.

When the user of the control device 9 wants to remotely display the place to be viewed 1, either on his own initiative, or because he has received an alarm message originating from an alarm system (not represented) with which the place to be viewed 1 is equipped, said user launches a tele-viewing application on the control device 9.

Figure 4:
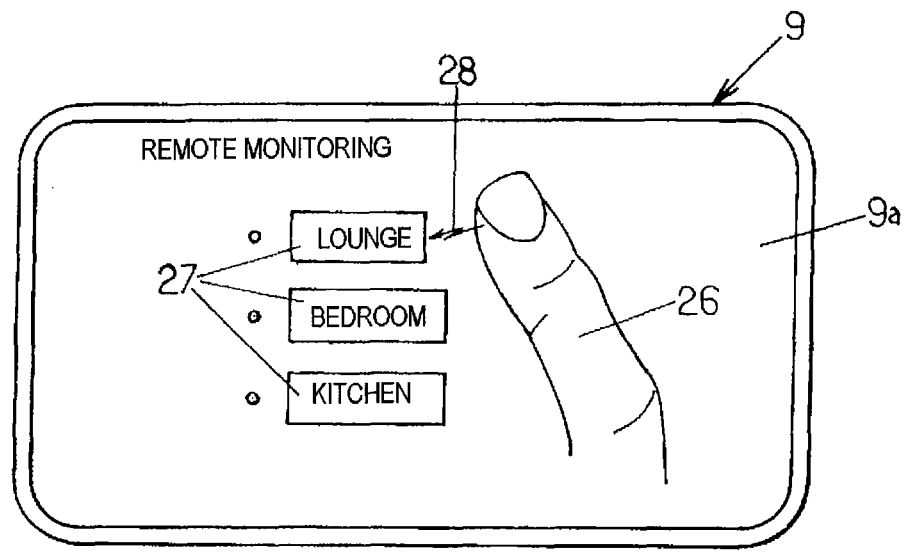
FIG. 4 shows an exemplary start menu for the tele-viewing application that can be presented on the screen of the control device belonging to the device of FIGS. 2 and 3.

This tele-viewing application may, for example, cause the screen represented in FIG. 4 to be displayed, presenting a menu which may notably comprise options corresponding to the various rooms of the place to be viewed 1 which are equipped with digital cameras, in this case three rooms consisting of a lounge, a bedroom and a kitchen each equipped with a digital camera 7 which communicates with the Internet point of access 8. Each of these three menu options corresponds to a touch-sensitive area 28 of the screen 9a. To choose one of these options, for example to choose the lounge, the user can, for example, tap twice in quick succession on the corresponding touch-sensitive area 27 with the end of one of his fingers 26, as diagrammatically represented by the arrow 28 in FIG. 4.

Figure 5:
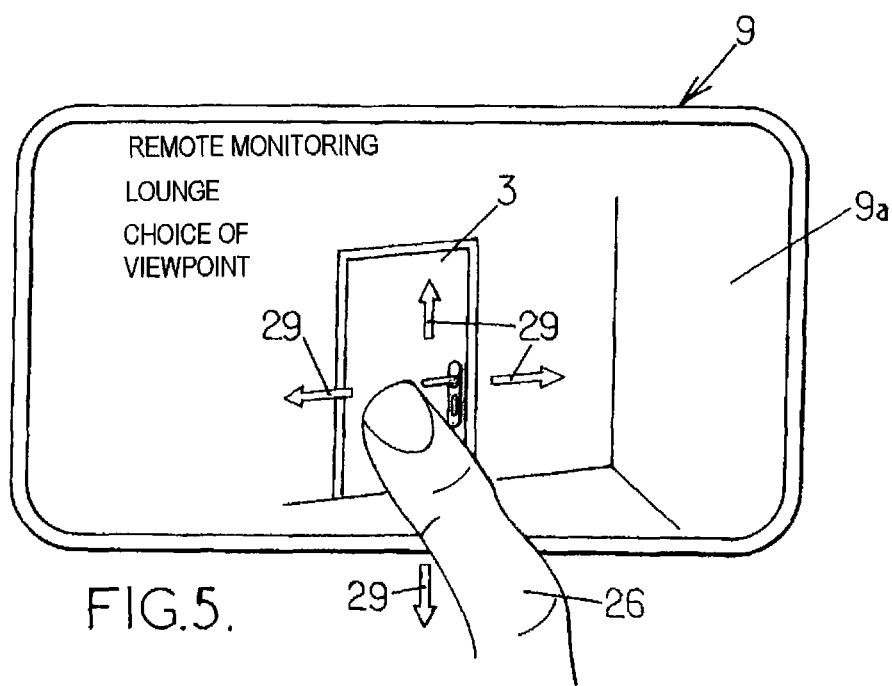
FIG. 5 shows an exemplary display of a virtual image of the place to be viewed on the screen of the control device, enabling a user to navigate in the virtual image.

As represented in FIG. 5, the control device 9 then causes a virtual image of the place to be viewed 1 to appear on the screen 9a, this virtual image being, in the example considered, taken from the abovementioned viewpoint C1.

The viewpoint initially presented for the virtual image may, for example, be the last viewpoint chosen by a user for viewing a real image of the place to be viewed 1, or else it may be a predetermined viewpoint, which is always the same.

The virtual image presented by the control device 9 is created locally by this control device, from virtual image data contained in its memory 25. The virtual image data concerned may consist, for example, of a VRML (Virtual Reality Markup Language) file made up from old images previously taken by the digital camera 7 and assembled to form a panoramic image of the place to be viewed 1. More specifically, this panoramic image may be a uniform equirectangular projection of the place to be viewed 1, seen from the position of the digital camera 7, this projection being able to be enriched with metadata such as mapping data between points of the image and the position of the digital camera 7, time stamps, images forming this projection, etc.).

This equirectangular projection is computed a first time at the time of installation of the digital camera 7, at which time images of the place to be viewed 1 are made to be taken from all possible viewpoints, these images then being assembled to form the abovementioned panoramic image. The assembling of said images may be done, for example, by the abovementioned remote computation center 30, but could, if necessary, be done directly either by the control device 9, or by the point of access 8 if they have sufficient computation capability.

Moreover, the abovementioned panoramic image is updated piece by piece as and when new images of the place to be viewed 1 are transmitted by the digital camera 7.

At the moment when the user displays the virtual image represented in FIG. 5, this image corresponds to a part of the abovementioned panoramic image, produced from old images, so that it is indeed a virtual image of the place to be viewed 1 and not a real-time image. At this stage, the digital camera 7 is also not necessarily activated and does not transmit any image to the control device 9.

As represented in FIG. 5, the user of the control device 9 can navigate in the panoramic image, for example by dragging the end of his finger 26 over the touch-sensitive screen 9a, as symbolized by the arrows 29. This dragging of the finger 26 of the user determines a change of viewpoint in the panoramic image, and the virtual image presented on the screen 9a is modified accordingly, as is common practice in the display of three-dimensional images.

Figure 6:
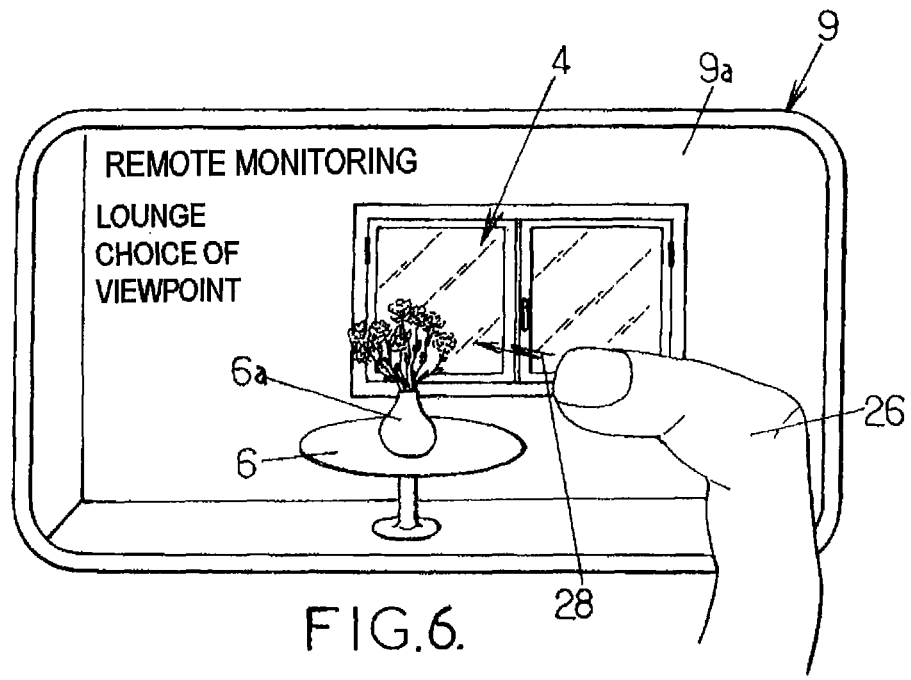
FIG. 6 is a view similar to FIG. 5, illustrating the confirmation of the desired viewpoint by the user, on the virtual image presented on the screen of the control device.

As represented in FIG. 6, when the user has reached the viewpoint from which he wants to display the place to be viewed 1 (in this case, a viewpoint onto the window 4), he confirms this viewpoint for example by tapping twice in quick succession on the touch-sensitive screen 9a with the end of his finger 26.

The control device 9 then sends a command to the digital camera 7, via the Internet and the point of access 8, in order, on the one hand, to activate said digital camera 7, and, on the other hand, to make its field of view move from its initial viewpoint (the last position where the mobile part of the digital camera 7 was stopped, corresponding to the viewpoint C1 in the example considered here), to the desired viewpoint C2, which, in the example considered, includes the window 4.

Figure 7:
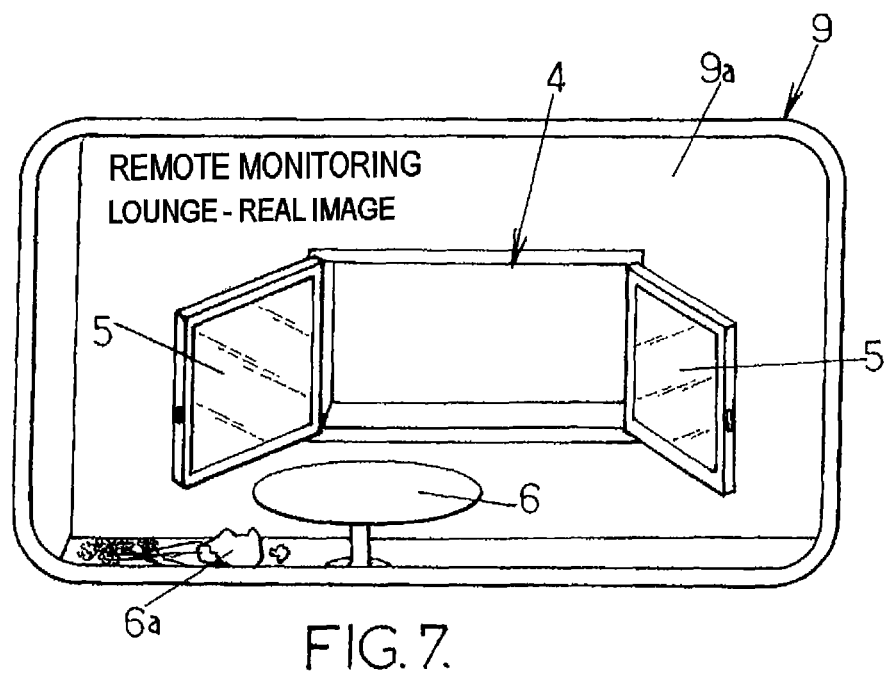
FIG. 7 is a view similar to FIG. 6, showing the display of the current image of the place to be viewed, from the viewpoint desired by the user.

The digital camera 7 is then oriented according to the desired viewpoint, and sends the current image of the place to be viewed 1 from this viewpoint, as represented in FIG. 7. In the particular example of FIG. 7, this current image is different from the virtual image that was previously visible on the screen 9a (FIG. 6) since the current image shows that the window 4 has been opened and the vase 6a which was initially on the table 6, has fallen to the ground, for example following an intrusion into the place to be viewed 1.

It will be noted that, during the movement of the digital camera 7 between the initial viewpoint C1 and the desired viewpoint C2, this digital camera may, advantageously, take intermediate images and send them, either in real time or in batch mode, to the remote computation center 30, which may use these images to partially update the panoramic image of the place to be viewed 1, then retransmit this panoramic image to the control device 9, for example in batch mode.

If appropriate, the panoramic image of the place to be viewed 1 may also be reset from time to time by having images of the place to be viewed 1 taken again from all the angles by the digital camera 7, for example when the digital camera 7 has not been activated by the user for a predetermined time (for example after a week of inactivity, or other period).

The invention claimed is:
1. A tele-viewing method comprising the following steps:
   (a) a connection step during which a portable control device provided with a screen and connected to the Internet network via a radio is made to remotely communicate via the Internet network with a motor-driven camera appliance with mobile field of view arranged in a place to be viewed, said camera appliance being suitable for seeing the place to be viewed from a plurality of viewpoints, (b) a control step during which field of view movements of said camera appliance are controlled to obtain a desired viewpoint over the place to be viewed out of said plurality of viewpoints, (c) a display step during which the place to be viewed is remotely displayed from the desired viewpoint, on the screen of the portable control device, the control step (b) comprising the following substeps:

(b1) presenting a first virtual image of the place to be viewed on the screen of the portable control device seen from a first viewpoint out of said plurality of viewpoints, said first virtual image being part of a panoramic virtual image of the place to be viewed and said panoramic virtual image obtained from virtual image data previously stored in the portable control device on the basis of old images of said place to be viewed, (b2) navigating in said panoramic virtual image by modifying the first viewpoint in said panoramic virtual image, until the desired viewpoint is obtained, and a second virtual image of the place to be viewed is presented on the screen of the portable control device seen from said desired viewpoint, said second virtual image being part of said panoramic virtual image, (b3) confirming the desired viewpoint in the second virtual image, (b4) moving a part of the camera device to place the field of view of the camera device according to the desired viewpoint in the second virtual image and taking at least one current image of the place to be viewed from said desired viewpoint, (b5) transmitting said current image to the portable control device and displaying said current image on the screen of the portable control device, wherein said transmission of the current image takes place only after the desired viewpoint in the second virtual image is confirmed and the camera device is moved to the desired viewpoint.

2. The method as claimed in claim 1, in which, during the substep (b4), intermediate images of the place to be viewed from intermediate viewpoints between an initial viewpoint and the desired viewpoint are stored while the field of view of the camera appliance is moved to the desired viewpoint.

3. The method as claimed in claim 2, in which said intermediate images are used to update said virtual image data in the portable control device, said virtual image data being subsequently used to create locally, on the portable control device, the panoramic virtual image of the place to be viewed.

4. A tele-viewing device for implementing a method as claimed in claim 1, comprising:

a motor-driven camera appliance with mobile field of view designed to be arranged in a place to be viewed, said camera appliance being suitable for seeing the place to be viewed from a plurality of viewpoints, a portable control device provided with a screen, link means suitable for having said camera appliance communicate remotely with said one portable control device, the portable control device being provided with a user interface enabling a user to control movements of the field of view of said camera appliance to obtain a desired viewpoint over the place to be viewed out of said plurality of viewpoints, and the screen of the portable control device being suitable for remotely displaying the place to be viewed from the desired viewpoint, the portable control device being designed to present on the screen a first virtual image of the place to be viewed seen from a first viewpoint out of said plurality of viewpoints, said first virtual image being a part of a panoramic virtual image of the place to be viewed and obtained from virtual image data previously stored in the portable control device from old images of said place to be viewed, said user interface being designed to enable a user to navigate in said panoramic virtual image by modifying the viewpoint in said panoramic virtual image out of said plurality of viewpoints until the desired viewpoint is obtained, and a second virtual image of the place to be viewed is presented on the screen of the portable control device seen from said desired viewpoint, said second virtual image being part of said panoramic virtual image, and said user interface being designed to confirm the desired viewpoint, said portable control device being designed to transmit to the camera appliance a command to make a part of the camera move to place the field of view of the camera device according to the desired viewpoint and to make it take at least one current image of the place to be viewed from said desired viewpoint, and said portable control device being designed to receive said current image via said link means and to display it on the screen, wherein the current image is received only after the desired viewpoint is confirmed and the camera appliance is moved to the desired viewpoint.

5. The device as claimed in claim 4, in which the camera appliance is a motor-driven digital camera.

6. The device as claimed in claim 4, in which the camera appliance operates on a battery.

7. The device as claimed in claim 4, in which the camera appliance is designed to take intermediate images of the place to be viewed from intermediate viewpoints between an initial viewpoint and the desired viewpoint while the field of view of the camera appliance is moved to the desired viewpoint.

8. The device as claimed in claim 7, in which the camera appliance is designed to transmit said intermediate images to the portable control device and said portable control device is designed to use said intermediate images to update said virtual image data.

9. A tele-viewing method comprising the following steps:

(a) a connection step during which a portable control device provided with a screen and connected to the Internet network by radio is made to remotely communicate via the Internet network with a motor-driven camera appliance with mobile field of view arranged in a place to be viewed, said camera appliance being suitable for seeing the place to be viewed from a plurality of viewpoints, (b) a control step during which field of view movements of said camera appliance are controlled to obtain a desired viewpoint over the place to be viewed out of said plurality of viewpoints, (c) a display step during which the place to be viewed is remotely displayed from the desired viewpoint, on the screen of the portable control device, the control step (b) comprising the following substeps:

(b1) a first virtual image of the place to be viewed is presented on the screen of the portable control device seen from a first viewpoint out of said plurality of viewpoints, said first virtual image being a part of a panoramic virtual image of the place to be viewed obtained from virtual image data previously stored in the portable control device on the basis of old images of said place to be viewed, (b2) navigation in said panoramic virtual image is obtained by modifying the viewpoint in said panoramic virtual image out of said plurality of viewpoints, until the desired viewpoint is obtained, and a second virtual image of the place to be viewed is presented on the screen of the portable control device seen from said desired viewpoint, said second virtual image being part of said panoramic virtual image and covering a certain field of view, (b3) the desired viewpoint in the second virtual image is confirmed, (b4) a part of the camera device is moved to place the field of view of the camera device according to the desired viewpoint in the second virtual image and it is made to take a current image of the place to be viewed from said desired viewpoint, (b5) said current image is transmitted to the portable control device and it is displayed on the screen of the portable control device, wherein the current image corresponds to the desired viewpoint in the second virtual image confirmed at substep (b3) and to the field of view of said second virtual image.

\* \* \* \* \*